United States Patent
Abe et al.

(10) Patent No.: US 6,661,476 B1
(45) Date of Patent: Dec. 9, 2003

(54) LIQUID CRYSTAL DISPLAY DEVICE AND ITS MANUFACTURING METHOD

(75) Inventors: Fumiaki Abe, Kanagawa (JP); Takusei Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 210 days.

(21) Appl. No.: 09/641,622

(22) Filed: Aug. 18, 2000

(30) Foreign Application Priority Data

Aug. 30, 1999 (JP) .......................................... P11-243990

(51) Int. Cl.[7] ................................................. G02F 1/13
(52) U.S. Cl. ........................................ 349/38; 349/39
(58) Field of Search .............................. 349/38, 39, 47; 257/59, 72

(56) References Cited

U.S. PATENT DOCUMENTS

| | | | | |
|---|---|---|---|---|
| 5,233,211 A | * | 8/1993 | Hayashi et al. ............. | 257/347 |
| 5,966,193 A | * | 10/1999 | Zhang .......................... | 349/39 |
| 6,038,004 A | * | 3/2000 | Nanno et al. ................. | 349/38 |
| 6,344,885 B1 | * | 2/2002 | Mori et al. ................... | 349/38 |

* cited by examiner

*Primary Examiner*—James Dudek
(74) *Attorney, Agent, or Firm*—Rader, Fishman & Grauer PLLC; Ronald P. Kananen

(57) ABSTRACT

A liquid crystal display device having a thin-film transistor for driving a pixel electrode and a storage capacity element on a substrate comprises the storage capacity element being formed to underlie a thin-film semiconductor layer forming said thin-film transistor. And its manufacturing method characterizes in making the storage capacity element on the substrate and making the thin-film transistor to overlie the storage capacity element via an inter-layer insulating film.

12 Claims, 11 Drawing Sheets

US 6,661,476 B1

LIQUID CRYSTAL DISPLAY DEVICE AND ITS MANUFACTURING METHOD

BACKGROUND OF THE INVENTION

1. Field of the Invention

This invention relates to a liquid crystal display device and its manufacturing method especially suitable for application to a TFT active matrix type liquid crystal display device.

2. Description of the Related Art

In liquid crystal devices of a conventional thin-film transistor (TFT) active matrix type, pixel signal switching thin-film transistors are provided for individual pixels. These pixels are arranged in the form of a matrix layout by wiring lines extending in horizontal and vertical directions. This type of conventional TFT active matrix liquid crystal display device is explained below in greater detail.

That is, as shown in FIG. 1, the TFT active matrix liquid crystal display device includes a horizontal scanning circuit 102, phase adjusting circuit 103, image signal supply switch 104, vertical scanning circuit 105 for controlling scanning directions, and cross-talk preventing circuit 106 for preventing cross-talk, which are carried on a TFT active matrix liquid crystal display substrate 101. Reference numeral 107 denotes external IC, and 108 denotes a connection terminal of the external IC.

In the image signal supply switch 104 and the vertical scanning circuit 105, TFTs 109 for controlling individual pixels are arranged in a matrix. Each TFT is made up of a source/drain electrode and a gate electrode G. The gates are commonly connected to the vertical scanning circuit 105. The source/drain electrodes SD are commonly connected to the image signal supply switch 104 and the cross-talk preventing circuit 106.

A pixel in the TFT active matrix liquid crystal device having the above-mentioned structure is shown in FIG. 2. As shown in FIG. 2, a thin-film semiconductor layer 112 of polycrystalline Si is formed in a predetermined pattern on a quartz glass substrate 111 to cover each shading region, and a gate dielectric film 113 is formed on the thin-film semiconductor layer 112. On gate dielectric film 113, a gate line is formed. Although not shown, in the thin-film semiconductor layer 112, a source region and a drain region are formed in self alignment with the gate line 114. The gate line 114 as a gate electrode and the source region and drain region make up each polycrystalline SiTFT for driving each pixel electrode. On a predetermined part of the gate dielectric film 113 above the drain region, a storage capacity line 115 is provided. This structure interposing the gate dielectric film 113 between the storage capacity line 115 and the drain region makes up a storage capacity element.

An inter-layer insulating film 116 is formed to cover the gate line 114 and the holding capacitor line 115. In predetermined locations of the inter-layer insulating film 116 and the gate dielectric film 113, contact holes 117, 118 are made. On the inter-layer insulating film 116, a lead-out electrode 119 is formed in connection with the drain region of the polycrystalline Si TFT through the contact hole 117, and a signal line 120 is formed in connection with the source region of the polycrystalline Si TFT through the contact hole 118. An inter-layer insulating film 121 is formed so as to cover the lead-out electrode 119 and signal line 120. The inter-layer insulating film 121 has formed a contact hole 122 in a predetermined position above the lead-out electrode 119. On the inter-layer insulating film 121, an upper-layer shading film 123 is formed in connection with the lead-out electrode 119 through the contact hole 122. The upper-layer shading film 123, lead-out electrode 119 and signal line 120 stacked together shade all regions excluding the pixel opening regions from incident light from above. Another inter-layer insulating film 124 is formed to cover the upper-layer shading film 123. The inter-layer insulating film 124 has formed a contact hole 125 in a predetermined position above the upper-layer shading film 123. On the inter-layer insulating film 124, a transparent pixel electrode 126 is provided in contact with the upper-layer shading film 123 through the contact hole 125. The pixel electrode 126 is covered by an orientation film 127 stacked thereon.

On the orientation film 127, a liquid crystal layer 128 is provided, which is covered by an orientation film 129 and an opposed common electrode 130. On the opposed common electrode 130, a transparent opposed electrode substrate 131 is provided.

In the liquid crystal display device having the above-explained configuration, a voltage applied to the transparent pixel electrode 126 connected to the thin-film semiconductor layer 112 forming TFT changes orientation of the liquid crystal molecules in the liquid crystal layer 128 to control the display.

Further provided in the display region are a signal line, gate line, storage capacity line, and thin-film transistor, among others. These lines and this transistor are located within an inter-pixel shading region provided in the TFT substrate or in the opposed substrate. An example of such an arrangement is shown in FIG. 3. FIG. 3 is an example of a plan-viewed layout of the configuration in which a signal line of the TFT substrate and an upper-layer shading film form a shading region in a complementary fashion.

As shown in FIG. 3, in the conventional liquid crystal device, the gate line 114 and the holding capacitor line 115 extend in parallel, and the signal lines 120 extend to intersect with the gate line 114 and holding capacitor line 115. The lead-out electrodes 119 extend over the gate line 114 and the holding capacitor line 115 so as to bridge them in locations not overlapping the signal lines 120. Each upper-layer shading film 123 has a geometry bridging two adjacent signal lines 120 and partly covering the holding capacitor line 115, the gate line 114 and lead-out electrode 119 located between these two signal lines 120. Each contact hole 118 is formed in a location of the signal line 120 overlapping an end portion of the thin-film semiconductor layer 112. The thin-film semiconductor layer 112 underlies the holding capacitor line 115 and the signal line layer 120. The holding capacitor line 115 has offset portions for avoiding the contact holes 117. Through each contact hole 117 in the offset portion, the thin-film semiconductor layer 112 and the lead-out electrode 119 are connected together. In the region where the lead-out electrode 119 and the upper-layer shading film 123 overlap, the contact hole 122 is formed to connect them. Further, in the region where the upper-layer shading film 123 and the holding capacitor line 115 overlap, the contact hole 115 is formed to connect them.

Conventional liquid crystal devices having the above-explained configuration have recently come to be often used as light bulbs of liquid crystal projectors. Along with this tendency, higher optical transmittance and higher definition have been desired. In order to realize such high optical transmittance and high definition, it is necessary to reduce the inter-pixel shading regions of the liquid crystal display device.

In the conventional liquid crystal display device, however, transistors, signal lines 120, gate lines 114 and holding capacitor lines 115 occupied their respective areas as shown in FIG. 3, and this was the bar against improvement of the pixel opening ratio.

OBJECTS AND SUMMARY OF THE INVENTION

It is therefore an object of the invention to provide a liquid crystal display device and its manufacturing method capable of reducing the pixel-to-pixel shading regions while maintaining a sufficient storage capacity area, and thereby attaining higher optical transmittance and higher definition.

According to the first aspect of the invention, there is provided a liquid crystal display device having a thin-film transistor for driving a pixel electrode and a storage capacity element on a substrate, comprising:

the storage capacity element being formed to underlie a thin-film semiconductor layer forming the thin-film transistor.

In a typical version of the first aspect of the invention, a storage capacity line can be set in a constant potential. Then, in a typical version of the first aspect of the invention, opposite ends of the storage capacity line outside the display region are grounded, and the potential is set in the constant potential of 0V. This constant potential may be the same as the potential of the opposed common electrode or the potential of the scan circuit supply power source within the range not giving influences to the threshold voltage Vth of the thin-film transistor.

In the first aspect of the invention, for the purpose of reducing incident light from the bottom surface of the TFT substrate into the thin-film transistor, the storage capacity line is typically located to overlap and cover the region for the channel of the thin-film transistor when viewed in its plan view. Typically, the region for the storage capacity line is located in an area having a margin around 1.0 $\mu$m with respect to the region for the channel of the thin-film transistor when viewed in their plan view. Further, in the first aspect of the invention, to more reliably block light entering from oblique directions, the storage capacity line is typically formed in a larger region than the region for the channel of the thin-film transistor. Preferably, it is a region outward larger by at least 0.5 $\mu$m in all directions than the region for the channel of the thin-film transistor.

In the first aspect of the invention, the storage capacity pixel electrode is typically provided in a region overlapping and wider than the region for the channel of the thin-film transistor.

In the first aspect of the invention, for the purpose of improving the dielectric constant and the resistance to voltage, the storage capacity dielectric film is typically made of a silicon oxide film, silicon nitride film, or a multi-layered film of a silicon oxide film and a silicon nitride film.

In the first aspect of the invention, for the purpose of ensuring a sufficient storage capacity Cs, thickness of the storage capacity dielectric film is within the range from 5 nm to 300 nm, and preferably within the range from 10 nm to 100 nm.

According to the second aspect of the invention, there is provided a manufacturing method of a liquid crystal display device having a thin-film transistor for driving a pixel electrode and a storage capacity element on a substrate, characterized in:

making the storage capacity element on the substrate; and making the thin-film transistor to overlie the storage capacity element via an inter-layer insulating film.

In the second aspect of the invention, the inter-layer insulating film is typically made on a storage capacity pixel electrode, a thin-film semiconductor layer is formed on the inter-layer insulating film, and a gate line is formed on the thin-film semiconductor layer via a gate dielectric film. Then, a source/drain region and the gate line formed on the thin-film semiconductor layer make up the thin-film transistor.

In a typical version of the second aspect of the invention, while the gate line is formed, a conductive layer connecting the source/drain region of the thin-film transistor to a storage capacity pixel electrode is made.

In a typical version of the second aspect of the invention, while a signal line is formed, a conductive layer connecting the source/drain region of the thin-film transistor to the storage capacity pixel electrode is made.

In the present invention, the thin film semiconductor layer constituting the thin film transistor is typically a polycrystalline silicon film. However, an amorphous silicon film, single crystal silicon film or compound semiconductor of gallium arsenide (GaAs), for example, can be used alternatively.

In the present invention, at least one of the storage capacity line and the storage capacity pixel electrode is typically made of a material selected from the group consisting of tungsten, molybdenum, tantalum, chromium, titanium, tungsten silicide, molybdenum silicide, tantalum silicide, chromium silicide, titanium silicide, tungsten alloy, molybdenum alloy, tantalum alloy, chromium alloy, titanium alloy, and polycrystalline silicon doped with an impurity. For the purpose of ensuring better bonding to the substrate, dielectric film, inter-layer insulating film, or the like, it may be made of a two-layered structure or three-layered structure additionally including polycrystalline silicon containing an impurity.

In the present invention, the gate line is typically made of a tungsten film, molybdenum film, tantalum film, chromium film, titanium film, tungsten silicide film, molybdenum silicide film, tantalum silicide film, chromium silicide film, titanium silicide film, tungsten alloy film, molybdenum alloy film, tantalum alloy film, chromium alloy film, titanium alloy film, or silicon film containing an impurity. Further, for the purpose of ensuring better bonding to the substrate, dielectric film, inter-layer insulating film, or the like, it may be made of a two-layered structure or three-layered structure additionally including polycrystalline silicon containing an impurity.

According to the liquid crystal display device and its manufacturing method having the above-summarized configuration according to the invention, since the storage capacity element is provided to underlie the thin-film transistor, it is possible to diminish constraints from other wiring lines or electrodes in determining the layout of the storage capacity element, thereby improving its design choice, and reducing the plan-viewed area occupied by the storage capacity element.

The above, and other, objects, features and advantages of the present invention will become readily apparent from the following detailed description thereof which is to be read in connection with the accompanying drawings.

DETAILED DESCRIPTION OF THE PREFERRED EMBODIMENTS

Figure 1:
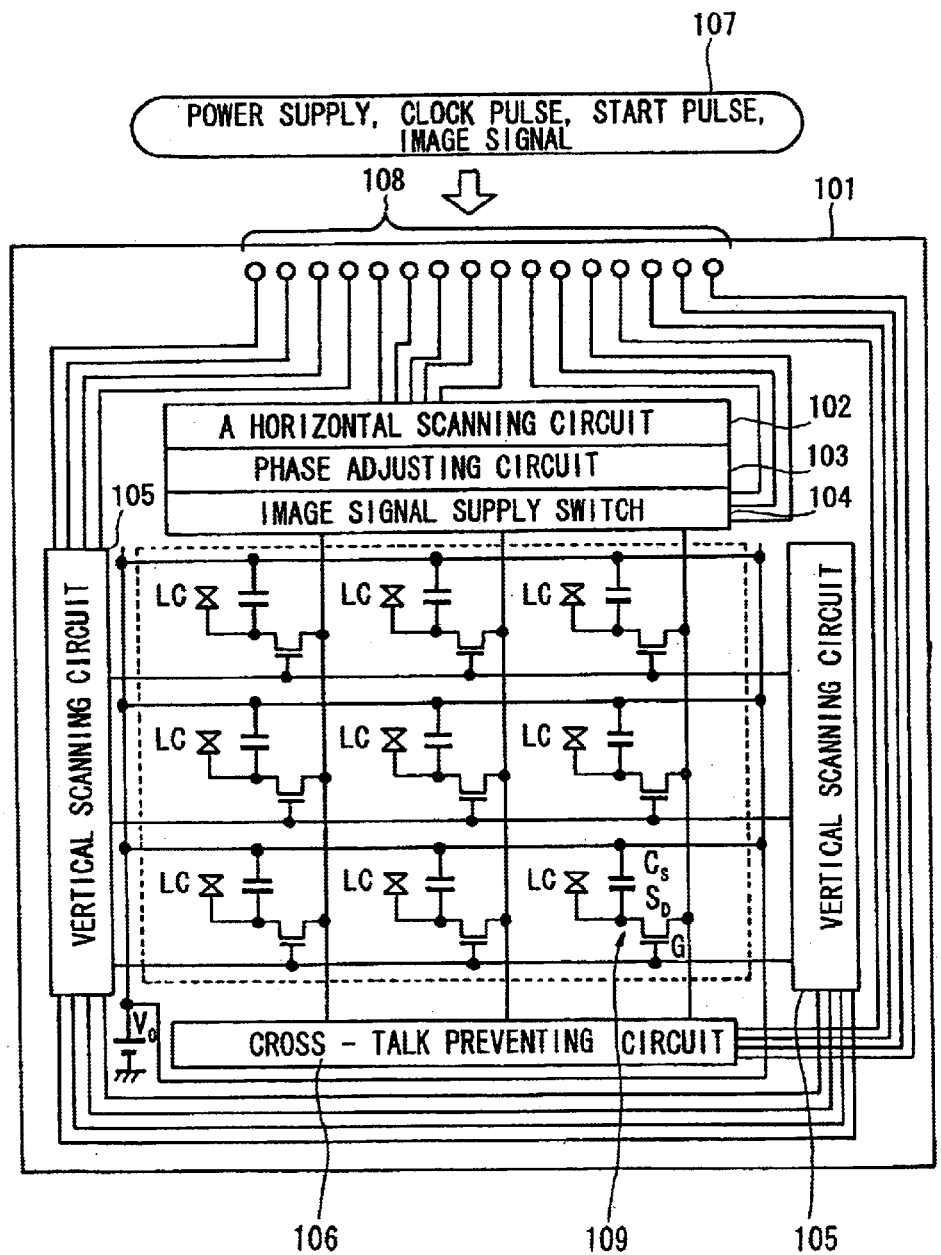
FIG. 1 is a block diagram showing a liquid crystal display device by a conventional technique.
Figure 2:
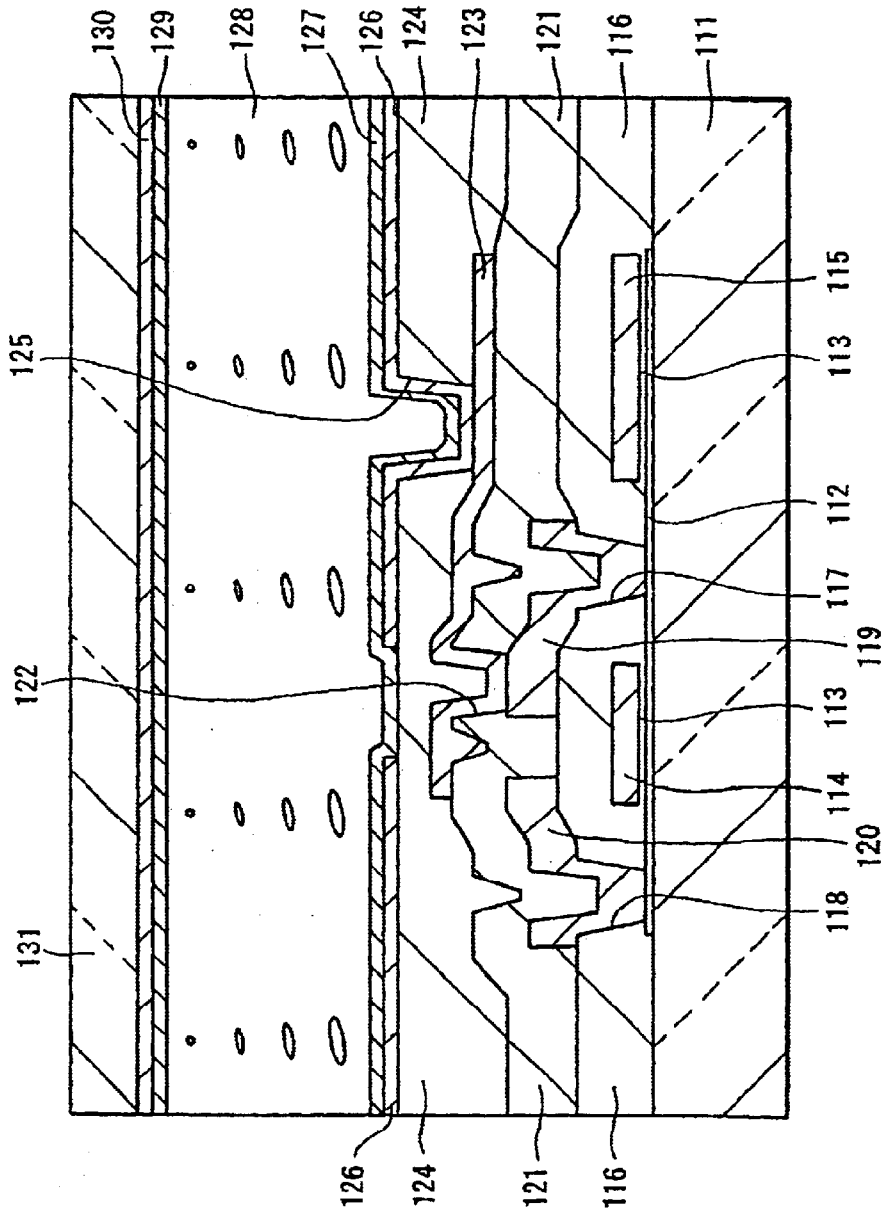
FIG. 2 is a cross-sectional view showing a conventional liquid crystal display device.
Figure 3:
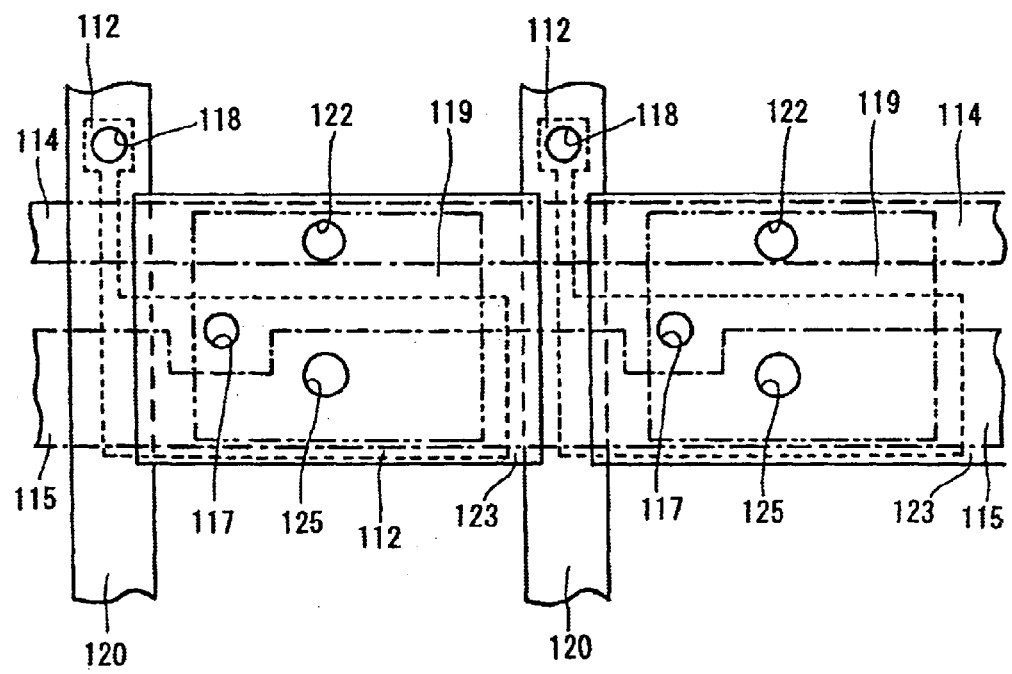
FIG. 3 is a plan view showing a plan-viewed layout of a TFT substrate of the conventional liquid crystal display device.

Explained below are embodiments of the invention with reference to the drawings. In all figures illustrating embodiments, identical or equivalent elements or parts are labeled with common reference numerals.

Figure 4:
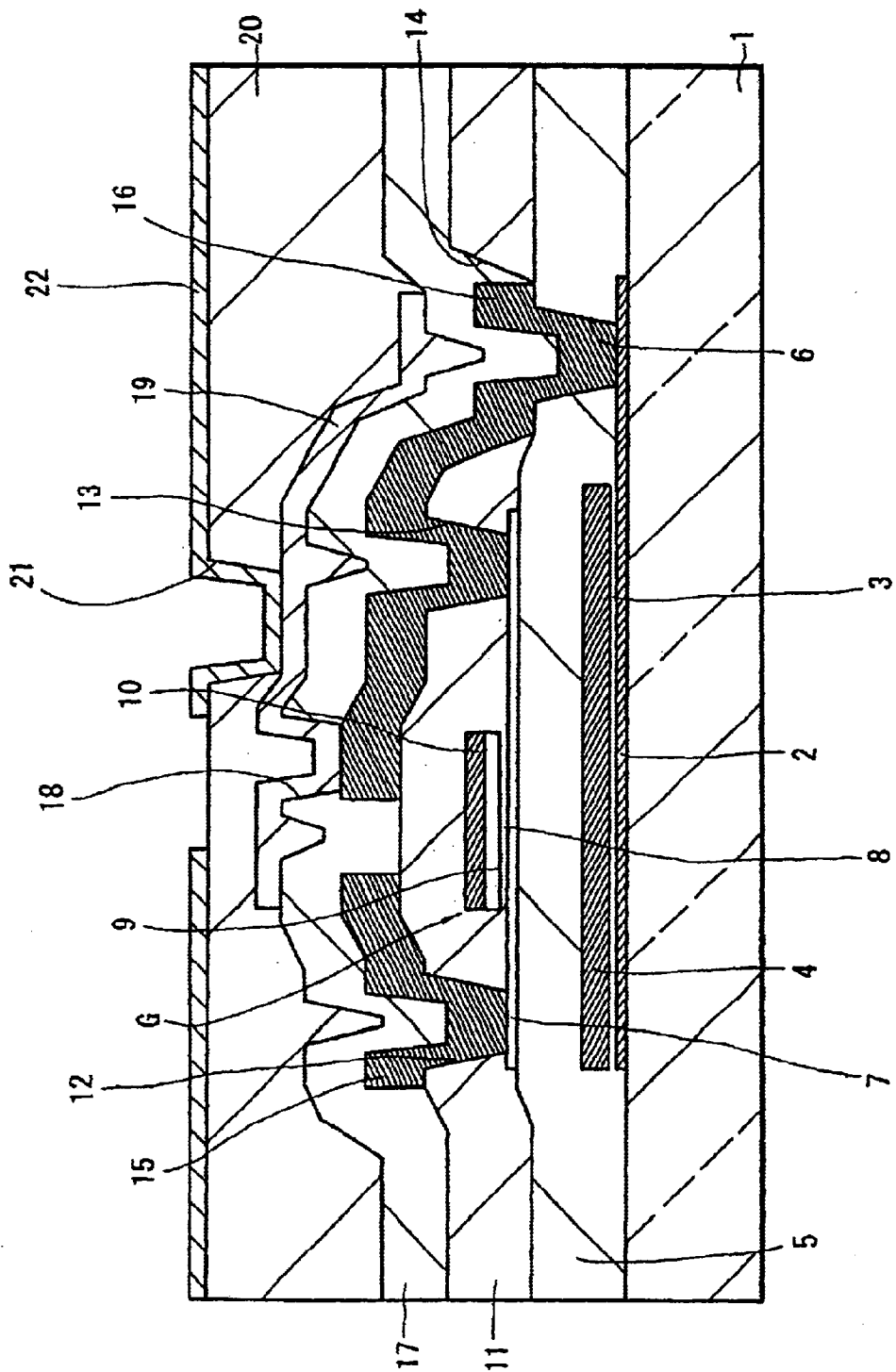
FIG. 4 is a cross-sectional view showing a TFT substrate of a liquid crystal display device according to the first embodiment of the invention.

FIG. 4 shows a TFT substrate of a liquid crystal display device as this example of the first embodiment, and FIG. 5 shows a plan-viewed layout of the TFT substrate. This liquid crystal display device is an active matrix type liquid crystal display device, for example.

As shown in FIG. 4, in this liquid crystal display device, a holding capacitor pixel electrode 2 having a predetermined geometry is provided on an insulating transparent substrate 1 made of quartz glass, for example, in a shading region. The holding capacitor pixel electrode 2 is made of a 50 nm thick WSi film, for example. Formed on the holding capacitor pixel electrode 2 is a storage capacity dielectric film 3. This storage capacity dielectric film 3 is made of a 60 nm thick SiO2 film, for example. Formed on the storage capacity dielectric film 3 is a storage capacity line 4 patterned to cross a display region. The holding capacitor line 4 is made of a 200 nm thick WSi film for example. An inter-layer insulating film 3 is commonly used as a holding capacitor dielectric film. This inter-layer insulating film 3 is a 600 nm thick non-doped silicate glass (NSG), for example. This structure interposing the storage capacity dielectric film 3 between the storage capacity line 4 and the storage capacity pixel electrode 2 makes up a storage capacity element.

An inter-layer insulating film 5 is formed to cover the storage capacity line 4. This inter-layer insulating film 5 is a 600 nm thick non-doped silicate glass (NSG), for example. The inter-layer insulating film 5 has formed a contact hole 6 above the storage capacity pixel electrode 2.

Formed on the inter-layer insulating film 5 is a thin-film semiconductor layer 7 of a predetermined geometry. Although not show, the thin-film semiconductor layer 7 has formed therein a source region and a drain region of LDD (lightly doped drain) structure. On the thin-film semiconductor layer 7, a gate dielectric film 8 is formed. The gate dielectric film 8 is a 30 nm thick $SiO_2$ film, for example. On the gate dielectric film 8, a gate line G is provided. The gate line G is a multi-layered film sequentially stacking a polycrystalline Si film 9 having the thickness of 100 nm, for example, and doped with phosphorus (P), or the like, as an impurity, to a high concentration, and a WSi film 10 having the thickness of 100 nm, for example. The gate line G forming a gate electrode and the source and drain regions of the LDD structure make up a polycrystalline Si TFT for driving a pixel electrode.

An inter-layer insulating film 11 is provided to cover the gate line G. In predetermined locations of the inter-layer insulating film 11 and the gate dielectric film 8, contact holes 12, 13 are formed, and the inter-layer insulating film 11 has an opening 14 above the contact hole 6. On the inter-layer insulating film 11 in the shading region, a signal line 15 is formed and connected to the source region of the polycrystalline Si TFT through the contact hole 12. A lead-out electrode 16 is also formed on the inter-layer insulating film 11 and connected to the drain region of the polycrystalline Si TFT through the contact hole 13. The lead-out electrode 16 is also connected to the storage capacity pixel electrode 2 through the opening 14 and the contact hole 6. The signal line 15 and lead-out electrode 16 are 400 nm thick Al alloy films containing Si by 1%, for example. So as to cover these signal line 15 and lead-out electrode 16, an inter-layer insulating film 17 is provided. This inter-layer insulating film 17 is a 400 nm thick film of phosphosilicate glass (PSG), for example, made by CVD using ozone ($O_3$) gas and tetraethyl oxosilane (TEOS) as the source material gas. In a portion of the inter-layer insulating film 17 above the lead-out electrode 16, a contact hole 18 is made.

On the inter-layer insulating film 17, a conductive upper-layer shading film 19 is stacked. The upper-layer shading film 19 is a 250 nm thick Ti film, for example, and connected to the lead-out electrode 16 through the contact hole 18. The stacked structure of the upper-layer shading film 19, lead-out electrode 16 and signal line 15 shades all regions excluding the pixel opening regions from incident light from above.

An inter-layer insulating film 20 is stacked to cover the upper-layer shading film 19. The inter-layer insulating film 20 is a 2.5 μm thick NSG film, for example. In a location of the inter-layer insulating film 20 above the upper-layer shading film 19, a contact hole 21 is made. The top surface of the inter-layer insulating film 20 other than the portion of the contact hole 21 is smoothed. Formed on the inter-layer insulating film 20 is a transparent pixel electrode 22 connected to the upper-layer shading film 19 through the contact hole 21. The pixel electrode 22 is a 140 nm thick indium tin oxide (ITO) film, for example.

Additionally, although not shown, an orientation film (not shown) is stacked so as to cover the pixel electrode 22.

Between the TFT substrate prepared as explained above and a structure, not shown, prepared by sequentially stacking on a major surface of a glass substrate a transparent electrode as an opposed electrode and a liquid crystal orientating film, a liquid crystal is confined to make up a liquid crystal display device.

Figure 5A:
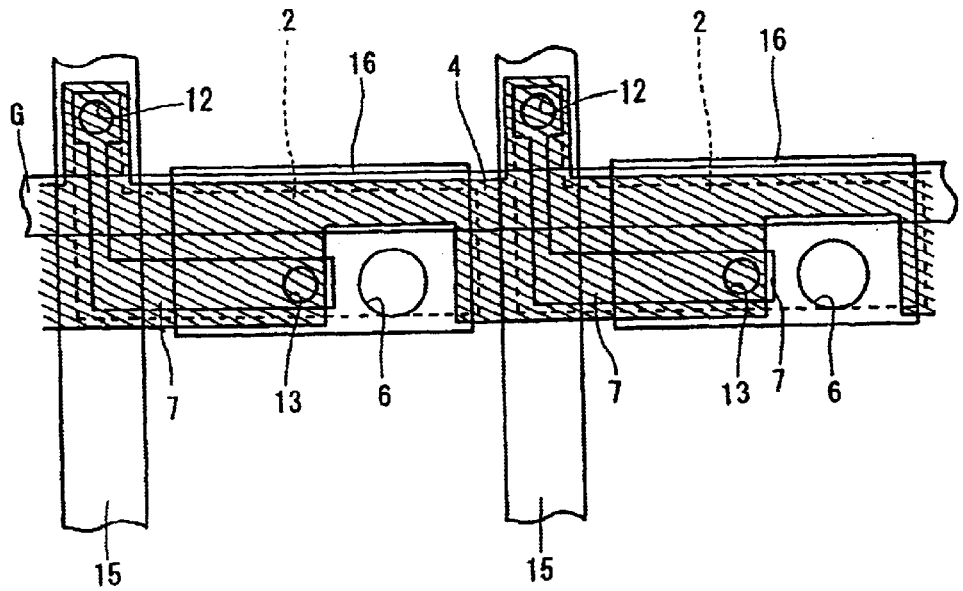
FIGS. 5A and 5B are plan views showing a plan-viewed layout of the TFT substrate of the liquid crystal display device according to the first embodiment of the invention.

FIG. 5A shows a plan-viewed layout of the liquid crystal display device just after making the signal line 15 and the lead-out electrode 16. As shown in FIG. 5A, in the liquid crystal display device according to the first embodiment, signal lines 15 extend in parallel. In regions between every adjacent signal line 15, lead-out electrodes 16 are provided. The gate line G extends perpendicularly to intersect with the lengthwise direction of the signal lines 15. Each holding capacitor pixel electrode 2 includes a portion extending along the signal line 15 and a portion extending along the lead-out electrode 16 to represent an L-shaped geometry as a whole. The storage capacity line 4 (hatched portion in FIG. 5A) extends in parallel with the gate line G. The holding capacitor line 4 includes projecting portions covering portions of the thin-film semiconductor layer 7 and recessed portions avoiding regions of the contact holes 6. Thus, the lead-out electrodes 16 are connected to the storage capacity pixel electrodes 2 through the contact holes 6 made in the regions where the storage capacity line 4 does not overlap the lead-out electrodes 16.

The thin-film semiconductor layer 7 is L-shaped in the portion overlapping the gate line G and the portion overlapping the storage capacity line 4. Each contact hole 12 is made at one end of the region where each thin-film semiconductor layer overlaps the signal line 15. Through this contact hole 12, the thin-film semiconductor layer 7 is connected to the signal line 15. Each contact hole 13 is made at an end of the region where the thin-film semiconductor layer 7 overlaps the lead-out electrode 16. Through this contact hole 13, the thin-film semiconductor layer 7 is connected to the lead-out electrode 16.

Figure 5B:
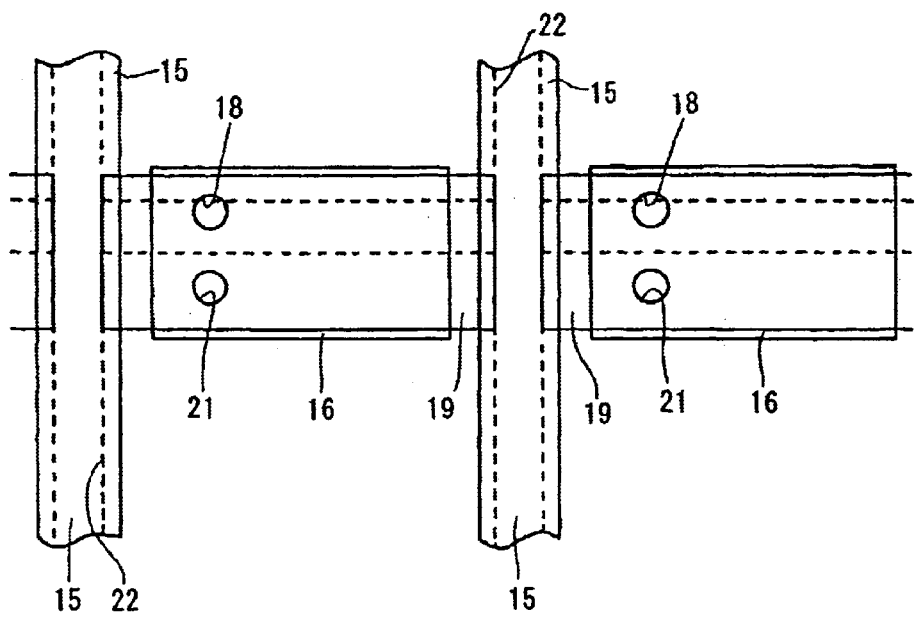

FIG. 5B shows a plan-viewed layout of the TFT substrate after making the pixel electrodes 22. As shown in FIG. 5B, the upper-layer shading film 19 is configured to bridge every adjacent parallel signal lines 15 and overlap the lead-out electrode 16. In the region where the upper-layer shading film 19 and the lead-out electrode 16 overlap, each contact hole 18 is made. Through this contact hole 18, the upper-layer shading film 19 and the lead-out electrode 16 are electrically connected together. The pixel electrode 22 is formed to overlap the signal lines 15 and the upper-layer shading film 19 and to cover portions not covered by the signal lines 15 and the upper-layer shading film 19. In regions where the pixel electrode 22 overlap the upper-layer shading film 19, the contact holes 21 are made. Through these contact holes 21, the upper-layer shading film 19 and the pixel electrode 22 are connected.

Next explained is a manufacturing method of the liquid crystal display device having the above-explained configuration according to the first embodiment.

First, as shown in FIG. 4, a WSi film is made on the insulating transparent substrate 1 by CVD, for example, and it is patterned in the form of islands for individual pixels to form the storage capacity pixel electrodes 2. After that, the storage capacity dielectric film 3 of $SiO_2$ is formed on the storage capacity pixel electrodes 2 by CVD, for example. The heating temperature used for making the storage capacity dielectric film 3 is 800° C., for example. After that, a 200 nm thick WSi film is made on the entire surface by CVD, for example, and it is patterned to extend across the display region, thereby to form the holding capacitor line 4. After that, a NSG film is stacked on the entire surface by atmospheric pressure chemical vapor deposition (AP-CVD), for example, to form the inter-layer insulating film 5.

Subsequently, a thin-film Si layer is formed on the inter-layer insulating film 5 by low-pressure chemical vapor deposition (LP-CVD), for example, and after growing crystal grains by annealing, for example, the thin-film Si layer is patterned to form the thin-film semiconductor layer 7 of polycrystalline Si. Then, after oxidizing the surface of the thin-film semiconductor layer 7, a p-type impurity such as boron (B), for example, is ion-implanted into the entire surface by a low concentration.

Thereafter, a $SiO_2$ film is stacked on the thin-film semiconductor layer 7 by CVD, for example, to form the gate dielectric film 8.

Subsequently, after the polycrystalline Si film 9 is formed on the gate dielectric film 8 by LP-CVD, for example, it is annealed in $POCl_3$ gas, for example, to diffuse P into the polycrystalline Si film 9 and decrease its resistance. Thereafter, the WSi film 10 is formed on the polycrystalline Si film 9 by CVD, for example. Then, the two-layered film of the polycrystalline Si film 9 and the WSi film 10 is patterned into the gate line geometry to form the gate line G.

After that, P as an n-type impurity is ion-implanted into the entire area to a low concentration. Then, by making a resist pattern (not shown) by lithography, a region for a p-channel MOS transistor and a region for the LDD in the region for an n-channel MOS transistor are masked, and an n-type impurity such as As, for example, is ion-implanted to a high concentration. As a result, in the thin-film transistor and other n-channel MOS transistors, source/drain regions having the LDD structure are made. The resist pattern is removed thereafter.

After that, after making a resist pattern (not shown) by lithography to mask the thin-film transistor and regions for n-channel MOS transistors in the circuit, a p-type impurity such as B, for example, is ion-implanted to a high concentration to form p-channel MOS transistors in the circuit.

After that, by stacking a PSG film on the entire surface by CVD using $O_3$ gas and TEOS gas, the inter-layer insulting film 11 is made. Thereafter, by annealing under a high temperature, crystallographic property of ion-implanted regions of the source region and the drain region is recovered, and the impurity is activated.

Subsequently, after making a resist pattern having apertures in locations of the storage capacity line 4 at right and left ends of the display region and the region for the contact hole 6, the inter-layer insulating film 11 is selectively removed by wet etching, for example. As a result, the aperture 14 is made.

After that, a resist pattern having apertures at portions of the storage capacity line 4 at right and left ends of the display region and regions for the contact holes 6, 12, 13 is made by lithography. Thereafter, using this resist pattern as a mask, etching is conducted by dry etching, for example. As a result, the contact holes 12, 13 are formed in locations of the inter-layer insulating film 11 on the thin-film semiconductor layer 7, and the contact hole 6 is formed in a location of the inter-insulating film 5 on the storage capacity pixel electrode 2. Additionally, although not shown, a predetermined contact hole is made in a portion of the circuit outside the gate line G and the pixel. The resist pattern is removed thereafter.

After that, an Al alloy film containing 1% of Si (Al—Si alloy film) is stacked on the entire surface by sputtering, for example. Then, a resist pattern (not shown) is made by lithography on regions for the signal line 15 and the lead-out electrode 16 and on regions for circuit internal lines and pads (both not shown). Thereafter, using this resist pattern as a mask, the Al alloy film is patterned by dry etching, for example. As a result, the signal line 15 and the lead-out electrode 16 are made, and at the same time, pads and circuit internal lines are made. In lieu of the Al—Si alloy as these lines and electrodes, Al—Si—Cu alloy, Al—Cu alloy, Al-based alloy, or Cu-based alloy is also usable. Alternatively, it is possible to use a multi-layered structure stacking a barrier metal such as Ti, TiN, TiON or WSi on or under the Al-based alloy or Cu-based alloy.

Subsequently, a PSG film is stacked on the entire surface by CVD using $O_3$ gas and TEOS gas, for example, to form the inter-layer insulting film 17. Next, a resist pattern (not shown) having apertures in regions for the contact hole 18 and pads is made on the inter-layer insulating film 17. Thereafter, using this resist pattern as a mask, the inter-layer insulating film 17 is etched by dry etching, for example, until the top surface of the lead-out electrode 16 is exposed. As a result, contact holes for connection to pads are formed, and at the same time, the contact hole 13 is made above the lead-out electrode 16. The resist pattern is removed thereafter.

After that, a Ti film is stacked on the entire surface by sputtering, for example, and thereafter patterned into a predetermined geometry by lithography and etching to make the upper-layer shading film 19.

Then, by plasma CVD using TEOS gas, for example, a NSG film is stacked to make the inter-layer insulating film 20.

Next, a resist pattern (not shown) having apertures in a region for the contact hole 21 and regions for pads is made on the inter-layer insulating film 20 by lithography. Using this resist pattern as a mask, the inter-layer insulating film 20 is selectively removed by dry etching, for example. As a result, the contact holes 21 are made, and the top surfaces of pads are exposed. The resist pattern is removed thereafter.

After that, annealing is conducted in $N_2$ gas containing 4% of H to improve the transistor property.

Subsequently, an ITO film is stacked by sputtering, for example, and it is patterned to make the transparent pixel electrode 22.

Thereafter, an orientation film is formed on the pixel electrode 22 to complete the TFT substrate, and the process is progressed in accordance with a known technique to complete the intended liquid crystal display device.

As explained above, according to the first embodiment, since the storage capacity element made up of the storage capacity line 4, storage capacity dielectric film 3 and storage capacity pixel electrode 2 is formed to underlie the thin-film semiconductor layer 7 forming the thin-film transistor, the storage capacity line 4 and the storage capacity pixel electrode 3 are released from constraints by other wiring lines like the gate line G of TFT when viewed in its plan view. Therefore, a wide area can be used for making the capacity of the storage capacity element while reducing the inter-pixel shading area, and a sufficient value of the storage capacity $C_s$ can be ensured. As a result, the pixel signal potential can be stabilized during the OFF time of the thin-film transistor of each pixel, and displayed images can be improved in quality. Moreover, since the storage capacity line 4 is located in the region having the margin of 1.0 $\mu$m or more in its plan view and having the width of at least 0.5 $\mu$m in all directions, the storage capacity pixel electrode 2 and the storage capacity line 4 function as a shading film for TFT against incident light entering from the bottom side of the TFT substrate, and can reduce light entering into the thin-film transistor from oblique angles. Therefore, it is possible to prevent degradation of images caused by optically excited current and improve the displayed image quality even more. As a result, this embodiment can improve the displayed image quality while reducing the inter-pixel shading area and realize higher optical transmittance and higher definition of the liquid crystal display device.

Figure 6:
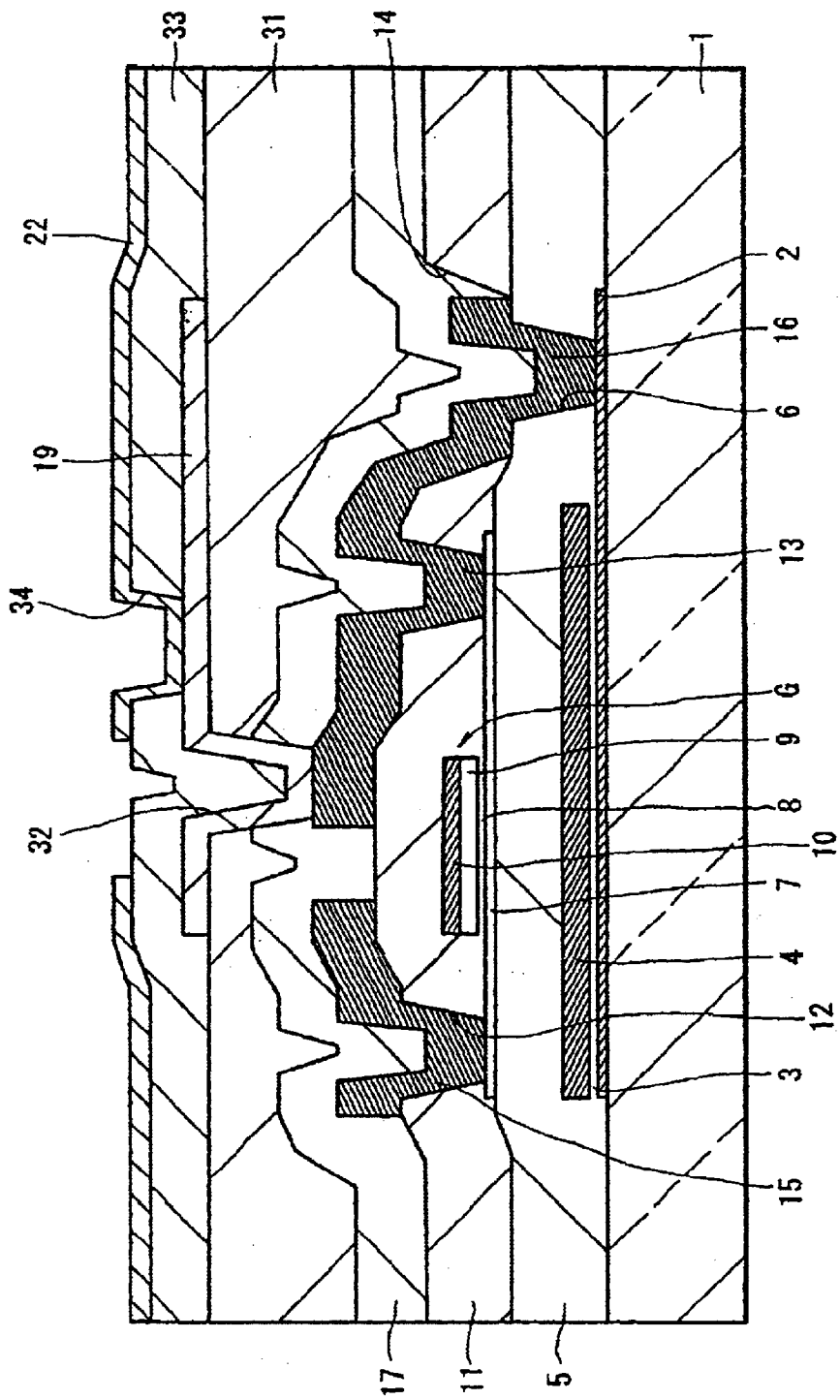
FIG. 6 is a cross-sectional view showing a TFT substrate of a liquid crystal display device according to the second embodiment of the invention.

Next explained is a liquid crystal display device according to the second embodiment of the invention. FIG. 6 shows a TFT substrate of the liquid crystal display device according to the second embodiment.

As shown in FIG. 6, in the liquid crystal display device according to the second embodiment, unlike the first embodiment, an inter-layer insulating film 31 having a smoothed top surface is stacked on the inter-layer insulating film 17. In a location of the inter-layer insulating films 31 and 17 above the lead-out electrode 16, a contact hole 32 is made. On the inter-layer insulating film 31, the upper-layer shading film 19 is formed, and the lead-out electrode 16 and the upper-layer shading film 19 are connected together through the contact hole 32. On the inter-layer insulating film 31, another inter-layer insulating film 33 is formed to cover the upper-layer shading film 19. In a portion of the inter-layer insulating film 33 above the upper-layer shading film 19, a contact hole 34 is made. On the inter-layer insulating film 33, the pixel electrode 22 is provided, and it is connected to the upper-layer shading film 19 through the contact hole 34. In all other respects, the second embodiment is the same as the first embodiment, and its explanation is omitted here.

In a manufacturing method of the liquid crystal display device having the above-explained configuration, the process is progressed to the step of making the inter-layer insulating film 17 in the same manner as the first embodiment. After that, unlike the first embodiment, the inter-layer insulating film 31 is formed on the inter-layer insulating film 17. Thereafter, the inter-layer insulating film 31 is smoothed by CMP, for example. Then, by lithography and etching, the contact hole 32 is made in a portion of the inter-layer insulating films 17 and 31 above the lead-out electrode 16. Then, after a Ti film is stacked on the entire surface by sputtering, for example, it is patterned to form the upper-layer shading film 19. Subsequently, the inter-layer insulting film 33 is stacked by CVD, for example, on the inter-layer insulating film 31 so as to cover the upper-layer shading film 19. Then, the contact hole 34 is made in a portion of the inter-layer insulating film 33 above the upper-layer shading film 19. After that, and an ITO film is stacked on the entire surface by sputtering, for example, it is patterned into a predetermined geometry to make the pixel electrode 22 of a predetermined configuration. The other steps and processes of this manufacturing method of the liquid crystal display device are the same as those of the first embodiment, and their explanation is omitted here.

According to the second embodiment, since the storage capacity element is formed to underlie the thin-film semiconductor layer 7, the same effects as those of the first embodiments are obtained. Additionally, since the upper-layer shading film 19 is made on the smoothed inter-layer insulating film 31, coverage of the upper-layer shading film 19 can be improved, and incident light from the opposed substrate can be shaded efficiently. Further, parasitic capacitance between the signal line 15 and the upper-layer shading film 19 can be reduced. Therefore, the second embodiment can further improve the quality of displayed images by the liquid crystal display device.

Figure 7:
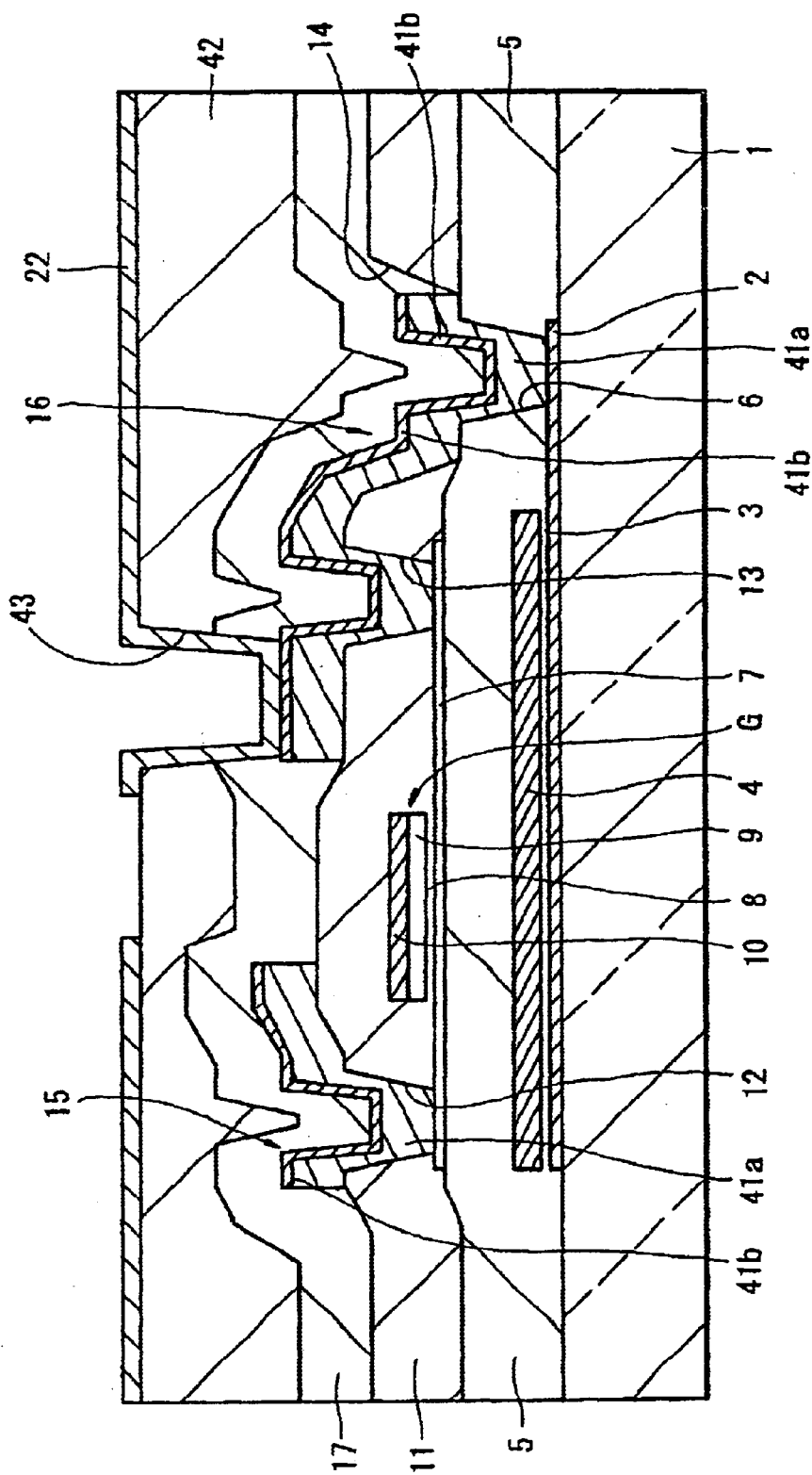
FIG. 7 is a cross-sectional view showing a TFT substrate of a liquid crystal display device according to the third embodiment of the invention.

Next explained is a liquid crystal display device according to the third embodiment of the invention. FIG. 7 shows a TFT substrate of the liquid crystal display device according to the third embodiment.

As shown in FIG. 7, in the liquid crystal display device according to the third embodiment, unlike the first embodiment, the signal line 15 and the lead-out electrode 16 have a two-layered structure stacking a TiN film 41b, for example, on an Al alloy film 41a containing 1% of Si. The inter-layer insulating film 17 is formed to cover the signal line and the lead-out electrode 16. Further, no upper-layer shading film is provided on the inter-layer insulating film 17, and instead, an inter-layer insulating film 42 having a smoothed top surface is provided. In a location of the inter-layer insulating films 17 and 42 above the lead-out electrode 16, the contact hole 43 is made. The pixel electrode 22 is formed on the inter-layer insulating film 42 and connected to the lead-out electrode 15 through the contact hole 43. Further, although not shown, an inter-pixel shading region corresponding to the upper-layer shading film 19 of the TFT substrate in the first embodiment is formed in the opposed substrate which is located above the TFT substrate via a liquid crystal layer. In all other respects, the liquid crystal display device shown here is the same as the first embodiment, and their explanation is omitted here.

In a manufacturing method of the liquid crystal display device according to the third embodiment having the above-explained configuration, the process is progressed in the same way as the first embodiment up to deposition of the inter-layer insulating film 11. Thereafter, the aperture 14 and the contact holes 6, 12, 13 are made sequentially. Subsequently, after the Al alloy film 41a containing Si by 1% is formed on the entire surface by sputtering, for example, the TiN film 41b is formed on the Al alloy film 41a. Then, the stacked film of the TiN film 41b and the Al alloy film 41a is patterned into a predetermined geometry to make the signal line 15 and the lead-out electrode 16. Thereafter, the inter-layer insulating film 17 is stacked on the entire surface to cover the signal line 15 and lead-out electrode 16. Next, the inter-layer insulating film 42 is stacked on the inter-layer insulating film 17 by CVD, for example, and its top surface is polished and smoothed by CMP, for example. Then, by lithography and etching, a portion of the inter-layer insulating films 17, 42 above the lead-out electrode 16 is removed by etching until the top surface of the TiN film 41b is exposed to make the contact hole 43. After that, an ITO film, for example, is stacked on the entire surface of the inter-layer insulating film 42 by sputtering, for example, to electrically connect the contact hole 43 to the lead-out electrode 16. Then, by patterning the ITO film into a predetermined configuration, the pixel electrode 22 is made. The other steps and processes of the manufacturing method of the liquid crystal display device shown here are the same as those of the first embodiment, and their explanation is omitted here.

As another version of the third embodiment, it is also possible to make contact holes (not shown) in a portion of the inter-layer insulating films 11, 17, 42 above the thin-film semiconductor layer 7 and directly connect the pixel electrode 22 and the thin-film semiconductor layer 7 through this contact hole.

According to the third embodiment, since the storage capacity element is formed to underlie the thin-film semiconductor layer 7, the same effects as those of the first embodiment can be obtained. Additionally, although the lead-out electrode 16 and the pixel electrode 22 are connected directly without making an upper-layer shading film 19 in the TFT substrate, since the lead-out electrode 16 is made of a two-layered structure stacking the TiN film 41b on the Al alloy film 41a containing Si by 1%, good electrical connection is ensured between the lead-out electrode 16 and the pixel electrode 22.

Figure 8:
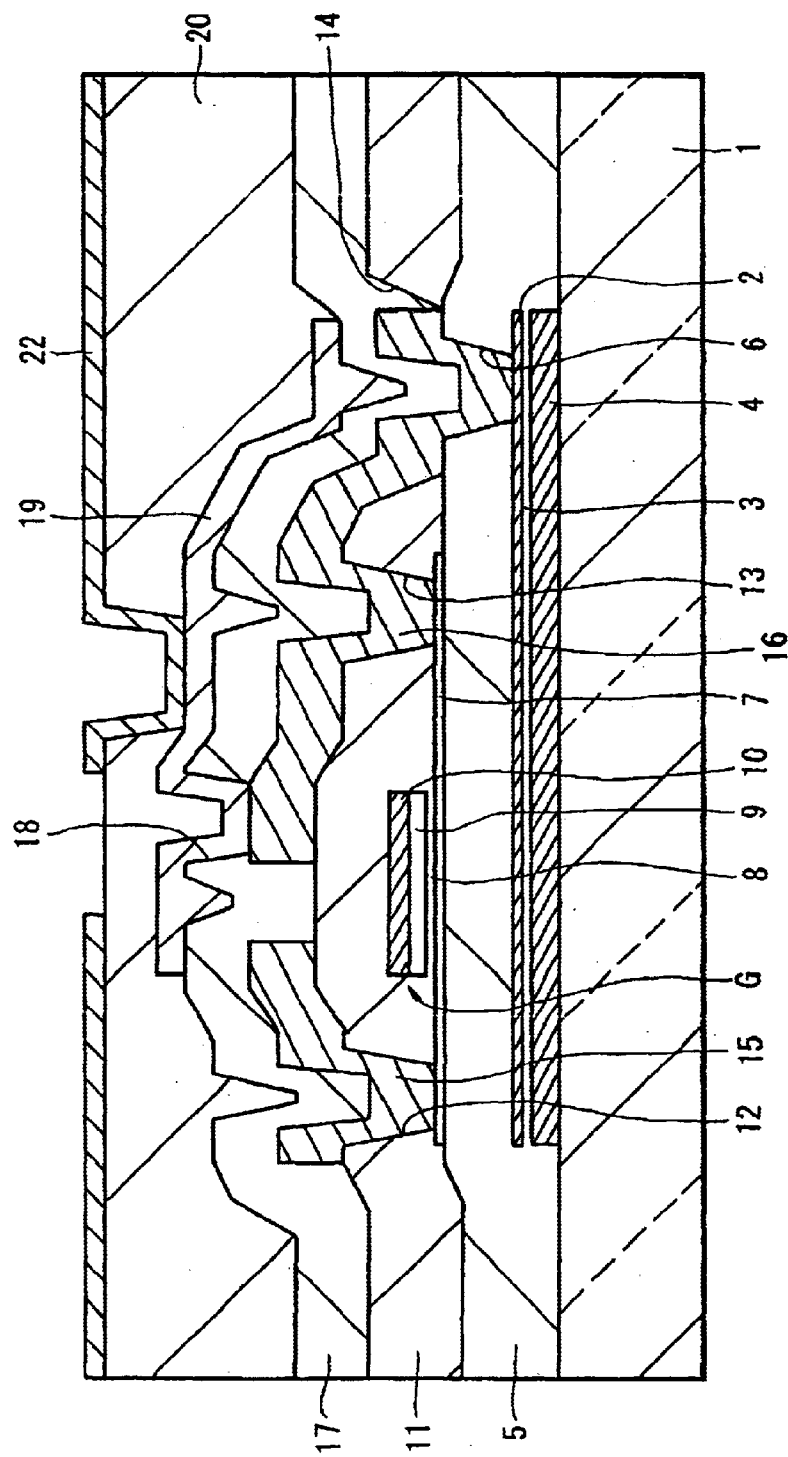
FIG. 8 is a cross-sectional view showing a TFT substrate of a liquid crystal display device according to the fourth embodiment of the invention.

Next explained is a liquid crystal display device according to the fourth embodiment of the invention. FIG. 8 is a TFT substrate of the liquid crystal display device according to the fourth embodiment.

As shown in FIG. 8, in the liquid crystal device according to the fourth embodiment, unlike the first embodiment, the storage capacity line 4 of a predetermined configuration is formed on the insulating transparent substrate 1. On the storage capacity line 4, the storage capacity pixel electrode 2 is formed via the storage capacity dielectric film 3. The contact hole 6 is made in a portion of the inter-layer insulating film 5 above the storage capacity pixel electrode 2. Through this contact hole 6, the storage capacity electrode 2 and the lead-out electrode 16 are electrically connected. In the other respects, the liquid crystal display device shown here is the same as the first embodiment, and their explanation is omitted here.

In a manufacturing method of the liquid crystal display device having the above-explained configuration, unlike the first embodiment, a WSi film having the thickness of 200 nm, for example, SiO$_2$ film having the thickness of 60 nm, for example, and WSi film having the thickness of 50 nm, for example, are first stacked sequentially on an insulating glass substrate 1 by CVD, for example. After that, by lithography and etching, the multi-layered WSi/SiO$_2$/WSi film is patterned to make the storage capacity pixel electrode 2, storage capacity dielectric film 3 and storage capacity line 4 which make up the storage capacity element. The other steps or processes of the manufacturing method of the liquid crystal display device according to the fourth embodiment are the same as those of the first embodiment, and their explanation is omitted here.

According to the fourth embodiment, since the storage capacity element is formed to underlie the thin-film semiconductor layer 7, the same effects as those of the first embodiment can be obtained. Additionally, since the storage capacity line 4 is made under the storage capacity pixel electrode 2 to make a stacked structure opposite from the storage capacity element in the first embodiment, it is not necessary to remove a part of the storage capacity line 4 to make a region for the contact hole 6. As a result, storage capacity area of the storage capacity element can be increased more, and its storage capacity Cs can be increased.

Figure 9:
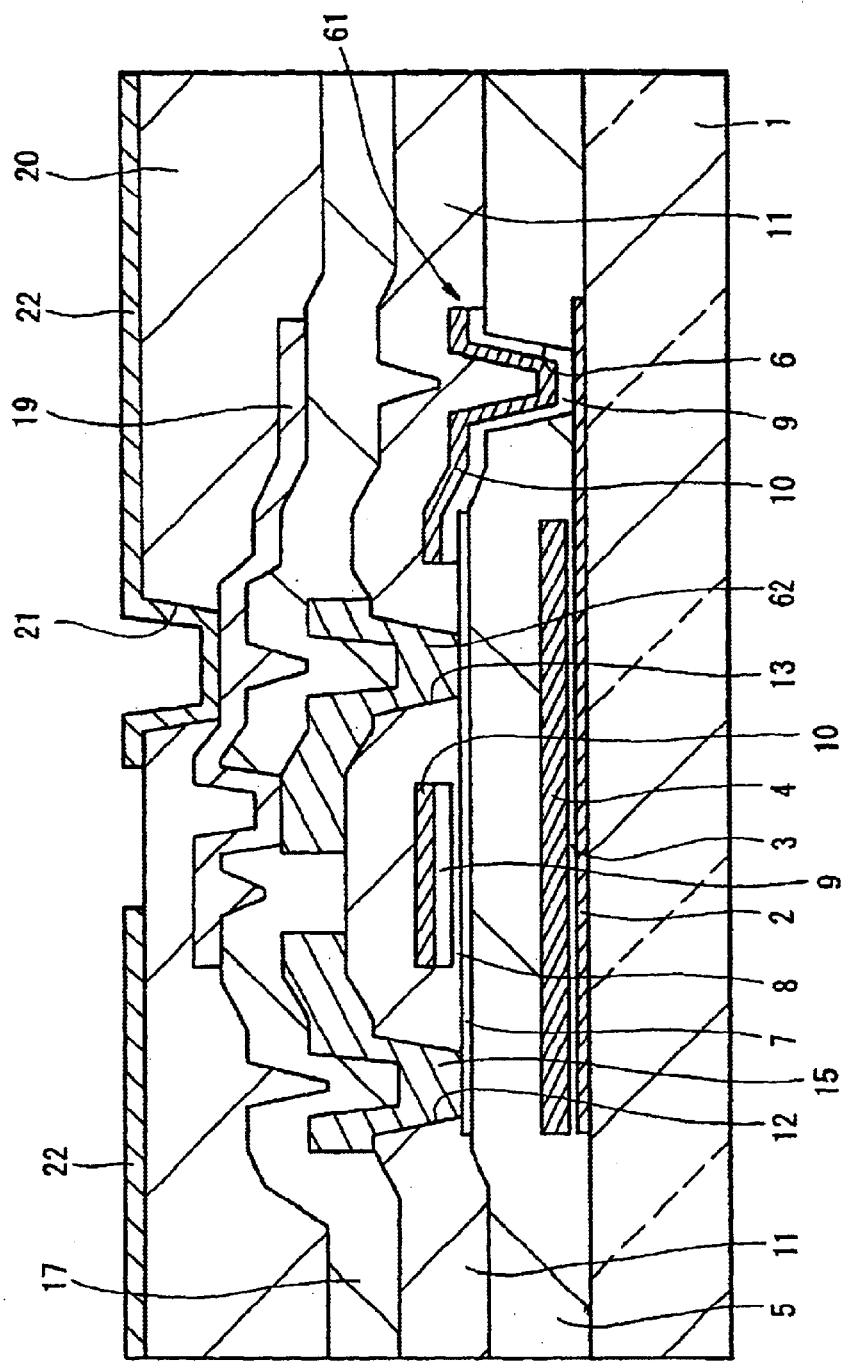
FIG. 9 is a cross-sectional view showing a TFT substrate of a liquid crystal display device according to the fifth embodiment of the invention.

Next explained is a liquid crystal display device according to the fifth embodiment of the invention. FIG. 9 shows a TFT substrate of the liquid crystal display device according to the fifth embodiment.

As shown in FIG. 9, in the liquid crystal display device according to the fifth embodiment, unlike the first embodiment, a lead-out electrode 61 connected to the storage capacity pixel electrode 2 through the contact hole 6 made in the inter-layer insulating film 5 has the same structure as the gate electrode G, namely, a multi-layered film of the polycrystalline Si film and the WSi film 10. One end of the lead-out electrode 61 is connected to the drain region of the thin-film semiconductor layer 7. As a result, the drain region of the thin-film transistor is electrically connected to the storage capacity pixel electrode 2. Additionally, through the contact hole 13 made in the inter-layer insulating film 11, an electrode 62 made of an Al alloy film containing Si by 1%, for example, is connected to the drain region of the thin-film semiconductor layer 7. In all other respects, the liquid crystal display device shown here is the same as the first embodiment, and their explanation is omitted here.

In a manufacturing method of the liquid crystal display device having the above-explained configuration, the process is progressed in the same manner as the first embodiment until deposition of the gate dielectric film 8 on the thin-film semiconductor layer 7. After that, unlike the first embodiment, the contact hole 6 is made in a portion of the inter-layer insulating film above the storage capacity pixel electrode 2 by lithography and etching. Thereafter, by sequentially stacking the polycrystalline Si film 9 doped with P and the WSi film 10 on the entire surface by LP-CVD, for example, the multi-layered film is made. After that, this multi-layered film-is patterned into a geometry forming the gate line G and overlapping the drain region of the thin-film semiconductor layer 7 in its plan view to enable connection with the storage capacity pixel electrode 2 through the contact hole 6. As a result, the gate line G and the lead-out electrode 61 which are made of the multi-layered film of the polycrystalline Si film 9 and the WSi film 10 are obtained. After that, the inter-layer insulating film 11 is stacked to cover the gate line G and the lead-out electrode 61, and the contact holes 12, 13 are made in portions of the inter-layer insulating film 11 above the thin-film semiconductor layer 7. Subsequently, after an Al alloy film containing 1% of Si is stacked by sputtering, it is patterned into the configuration of the signal line 15 and the electrode 62. As a result, the signal line 15 connected to the source region of the thin-film semiconductor layer 7 through the contact hole 12 is made, and at the same time, the electrode 62 connected to the drain region of the thin-film semiconductor layer 7 is made. Thereafter, the inter-layer insulating film 17 made of PSG is stacked on the entire surface by CVD using 03 gas and TEOS gas. The other steps or processes of the manufacturing method of this liquid crystal display device are the same as those of the first embodiment, their explanation is omitted here.

According to the fifth embodiment, since the storage capacity element is formed to underlie the thin-film semiconductor layer 7, the same effects as those of the first embodiment can be obtained.

Figure 10:
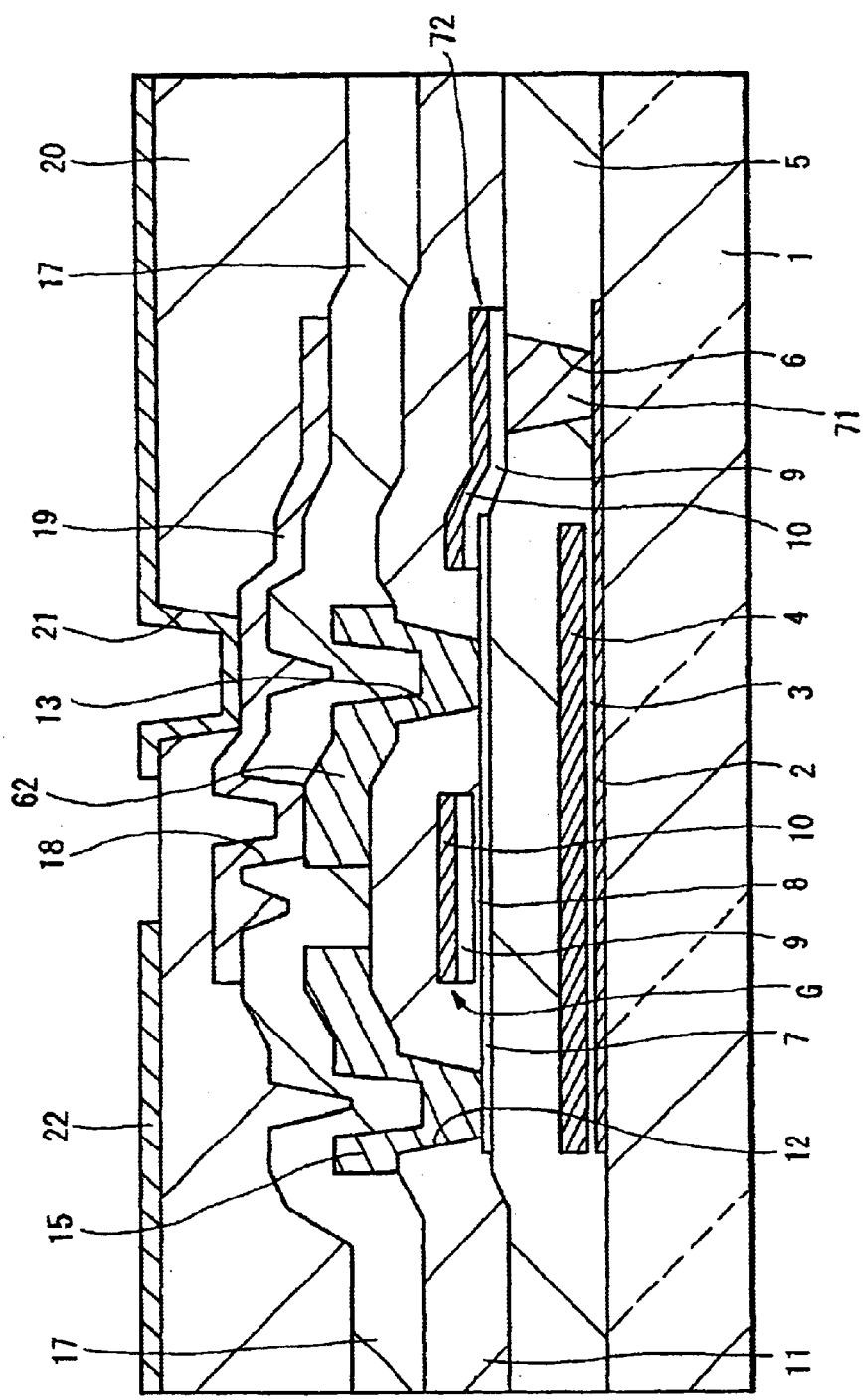
FIG. 10 is a cross-sectional view showing a TFT substrate of a liquid crystal display device according to the sixth embodiment of the invention.

Next explained is a liquid crystal display device according to the sixth embodiment of the invention. FIG. 10 shows a TFT substrate of the liquid crystal display device according to the sixth embodiment.

In the liquid crystal device according to the sixth embodiment, unlike the fifth embodiment, a contact plug 71 of W, for example, is buried inside the contact hole 6 formed in a portion of the inter-layer insulating film 5 above the storage capacity pixel electrode 2. Additionally, a lead-out electrode 72 made of a multi-layered film of sequentially stacked polycrystalline Si film 9 and WSi film 10 is provided on the inter-layer insulating film 5 in connection with the contact plug 71. As a result, the storage capacity pixel electrode 2 and the lead-out electrode 72 are electrically connected through the contact plug 71. In all other respects, the liquid crystal display device shown here is the same as the fifth embodiment, and their explanation is omitted here.

In a manufacturing method of the liquid crystal display device having the above-explained configuration, the process is progressed in the same manner as the first embodiment up to deposition of the inter-layer insulating film 5. After that, unlike the first embodiment, the contact hole 6 is made in a portion of the inter-layer insulating film 5 above the storage capacity pixel electrode 2 by lithography and etching. Subsequently, a W film is stacked on the entire surface by blanket W-CVD, for example, to bury the contact hole 6 inside. After that, the W film is partly removed by etch-back using chlorine trifluoride ($ClF_3$) gas, for example, as the etching gas. As a result, the contact plug 71 of W is buried inside the contact hole 6. After that, in the same manner as the first embodiment, the thin-film semiconductor layer 7 and the gate dielectric film 8 are stacked sequentially. Then, by LP-CVD, for example, the polycrystalline Si film 9 doped with P and the WSi film 10 are sequentially stacked on the entire surface to form a multi-layered film. This multi-layered film is next patterned into a geometry forming the gate line G and partly overlapping the thin-film semiconductor layer 7 while connecting to the contact plug 71.

As a result, the gate line G and the lead-out electrode 72 in form of the multi-layered film of the polycrystalline Si film 9 and the WSi film 10 are obtained. Thereafter, the inter-layer insulating film 11 is stacked to cover the gate line G and lead-out electrode 72. The other steps or processes of the manufacturing method of this liquid crystal display device are the same as those of the first embodiment, and their explanation is omitted here.

According to the sixth embodiment, since the storage capacity element is formed to underlie the thin-film semiconductor layer 7, the same effects as those of the first embodiment and the fifth embodiment can be obtained. Additionally, since the lead-out electrode 72 and the storage capacity pixel electrode 2 are connected via the contact plug 71, coverage of the lead-out electrode 72 can be improved.

Figure 11:
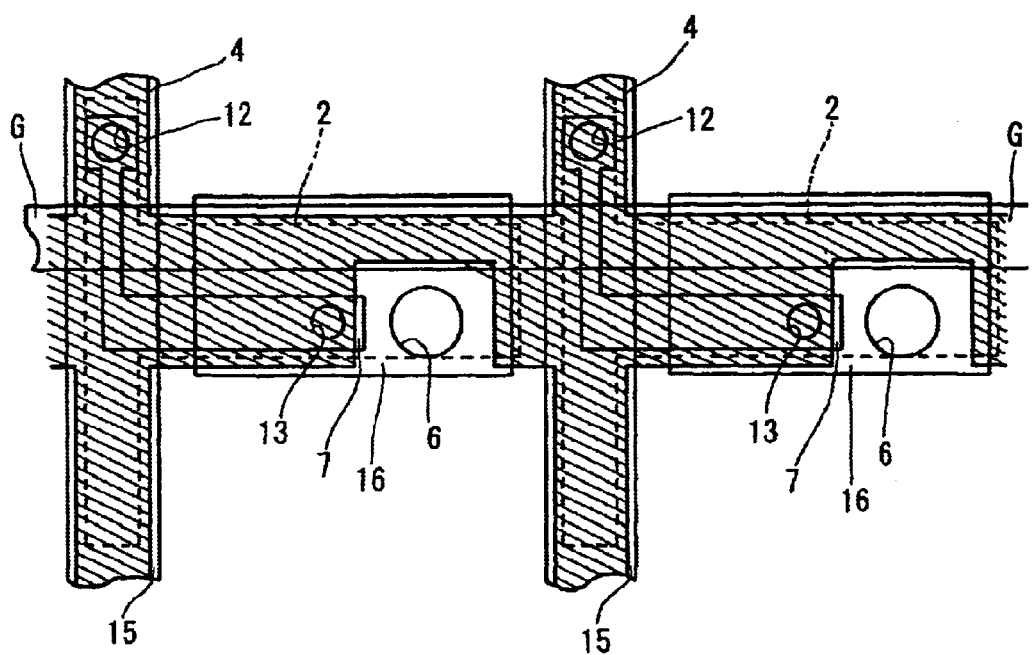
FIG. 11 is a plan view showing a plan-viewed layout of a TFT substrate of a liquid crystal display device according to the seventh embodiment of the invention.

Next explained is a liquid crystal display device according to the seventh embodiment of the invention. FIG. 11 shows a plan-viewed layout of the liquid crystal display device according to the seventh embodiment.

As shown in FIG. 11, in the liquid crystal display device according to the seventh embodiment, unlike the first embodiment, the storage capacity line 4 (hatched portion in FIG. 11) is formed to extend in the lengthwise direction of the signal line 15 in a region overlapping the signal line 15. That is, the storage capacity line 4 extends in the form of a rectangular lattice underlying the signal lines 15 and the lead-out electrodes 16 and following their geometry. The other respects of the structure and manufacturing method of the liquid crystal display device according to the seventh embodiment are the same as the first embodiment, and their explanation is omitted here.

According to the seventh embodiment, the same effects as those of the first embodiment can be obtained, and at the same time, since the storage capacity line 4 is formed to extend in the lengthwise direction of the signal lines 15 underlying and overlapping the signal lines 15, that is, in the form of a rectangular lattice, the storage capacity area can be further increased, and a liquid crystal display device with a higher reliability can be obtained.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

For example, numerical values, structures, configurations, materials, processes, and others indicated in the above description of the embodiments are not but mere examples, and it is needless to say that other appropriate numerical values, structures, configurations, materials and processes, for example, can be used.

Although the first embodiment used a $SiO_2$ film as the storage capacity dielectric film 3, a SiN film or $SiO_2/SiN/SiO_2$ film, for example, may be used as the storage capacity dielectric film 3.

Moreover, although the first embodiment used a WSi film as the storage capacity pixel electrode 2 and the storage capacity line 4, it is also possible to use a polycrystalline Si film doped with an impurity as the storage capacity pixel electrode 2 and the storage capacity line 4. Furthermore, although the gate line G is made of a multi-layered film stacking the WSi film 10 on the polycrystalline Si film 9, a W film, Mo film, Ta film, Cr film or Ti film is also usable as the film to be stacked on the polycrystalline Si film 9. Any of their silicide films and the alloy films can be used as well.

As described above, according to the invention, the storage capacity element is formed to underlie a thin-film semiconductor layer forming a thin-film transistor, it is possible to increase the design choice of the storage capacity element, reduce the inter-pixel shading regions while ensuring a wider storage capacity area, and thereby obtain a liquid crystal display device with higher optical transmittance and higher definition.

What is claimed is:

1. A liquid crystal display device having a thin-film transistor for driving a pixel electrode and a storage capacity element on a substrate, comprising:

said storage capacity element being formed to underlie a thin-film semiconductor layer forming said thin-film transistor wherein said storage capacity element is made of a structure interposing a storage capacity dielectric film between a storage capacity line and a storage capacity pixel electrode.

2. The liquid crystal display device according to claim 1 wherein a diffusion layer forming source/drain regions of said thin-film transistor is electrically connected to said storage capacity pixel electrode.

3. The liquid crystal display device according to claim 1 wherein said storage capacity line is provided in a region overlapping and covering a channel region of said thin-film transistor in a plan view thereof.

4. The liquid crystal display device according to claim 1 wherein said storage capacity line can be set in a constant potential.

5. The liquid crystal display device according to claim 1 wherein said storage capacity pixel electrode is provided in a region overlapping and covering a channel region of said thin-film transistor in its plan view.

6. The liquid crystal display device according to claim 1 wherein said storage capacity dielectric film is a silicon oxide film, a silicon nitride film or a multi-layered film stacking a silicon oxide film and a silicon nitride film.

7. The liquid crystal display device according to claim 1 wherein the thickness of said storage capacity dielectric film is in the range from 5 nm to 300 nm.

8. The liquid crystal display device according to claim 1 wherein at least one of said storage capacity line and said storage capacity pixel electrode is made of a material selected from the group consisting of tungsten, molybdenum, tantalum, chromium, titanium, tungsten silicide, molybdenum silicide, tantalum silicide, chromium silicide, titanium silicide, tungsten alloy, molybdenum alloy, tantalum alloy, chromium alloy, titanium alloy, and polycrystalline silicon doped with an impurity.

9. A manufacturing method of a liquid crystal display device having a thin-film transistor for driving a pixel electrode and a storage capacity element on a substrate, characterized in:

making said storage capacity element on said substrate; and making said thin-film transistor to overlie said storage capacity element via an inter-layer insulating film wherein said storage capacity element is made by sequentially stacking a storage capacity pixel electrode, a storage capacity dielectric film and a storage capacity line on said substrate.

10. The manufacturing method of a liquid crystal display device according to claim 9 wherein an inter-layer insulating film is formed on said storage capacity pixel electrode, a thin-film semiconductor is formed on said inter-layer insulating film, and a gate line is formed on said thin-film semiconductor layer via a gate dielectric film.

11. The manufacturing method of a liquid crystal display device according to claim 9 wherein a gate line is formed, and at the same time, a conductive layer connecting a diffusion layer of said thin-film transistor to said storage capacity pixel electrode is formed.

12. The manufacturing method of a liquid crystal display device according to claim 9 wherein a signal line is formed, and at the same time, a conductive layer connecting a diffusion layer of said thin-film transistor to said storage capacity pixel electrode is formed.

* * * * *